(12) United States Patent
Sterne Stroebe et al.

(10) Patent No.: US 10,926,732 B2
(45) Date of Patent: Feb. 23, 2021

(54) VEHICLE INTERIOR COMPONENT

(71) Applicant: Shanghai Yanfeng Jinqiao Automotive Trim Systems Co. Ltd., Novi, MI (US)

(72) Inventors: Jennifer Anne Sterne Stroebe, Holland, MI (US); Bart William Fox, Zeeland, MI (US); Michael Gerard Zimmer, Belmont, MI (US); Michael Edward Phillips, Holland, MI (US); Dale Todd Glynn, Allendale, MI (US)

(73) Assignee: Shanghai Yanfeng Jinqiao Automotive Trim Systems Co. Ltd., Novi, MI (US)

( * ) Notice: Subject to any disclaimer, the term of this patent is extended or adjusted under 35 U.S.C. 154(b) by 89 days.

(21) Appl. No.: 16/220,863

(22) Filed: Dec. 14, 2018

(65) Prior Publication Data

US 2019/0118756 A1 Apr. 25, 2019

Related U.S. Application Data

(63) Continuation of application No. PCT/US2017/038572, filed on Jun. 21, 2017.
(Continued)

(51) Int. Cl.
*B60R 21/2165* (2011.01)
*B60R 13/02* (2006.01)
(Continued)

(52) U.S. Cl.
CPC ...... *B60R 21/2165* (2013.01); *B60R 13/0256* (2013.01); *B29L 2031/3038* (2013.01); *B60R 21/205* (2013.01)

(58) Field of Classification Search
CPC .............. B60R 13/0256; B60R 21/205; B60R 21/2165; B29L 2031/3038
See application file for complete search history.

(56) References Cited

U.S. PATENT DOCUMENTS

| 5,082,310 A | 1/1992 | Bauer |
| 5,456,490 A | 10/1995 | Carter et al. |

(Continued)

FOREIGN PATENT DOCUMENTS

| DE | 10122312 A1 | 11/2002 |
| EP | 0779185 A2 | 6/1997 |

(Continued)

OTHER PUBLICATIONS

International Search Report and Written Opinion of the International Searching Authority for PCT Application No. PCT/US2017/038572 dated Aug. 29, 2017 (in English) (29 pages).

(Continued)

*Primary Examiner* — Faye M Fleming

(57) ABSTRACT

A vehicle interior component is disclosed. The component may facilitate deployment of an airbag and may comprise a panel comprising fibers. The panel may comprise a notch formed as a depression in a first side of the panel and at least one feature adjacent the notch. A second side of the panel may comprise a substantially planar surface opposite the notch. The panel may comprise at least one of a resin, a thermoplastic resin, polypropylene, acrylonitrile butadiene styrene, polycarbonate. The notch may direct deployment of the airbag through the panel. The feature may comprise a protrusion to provide a relief for the notch. The component may comprise a rib formed on the panel adjacent the notch comprising resin. The rib may comprise a resin portion comprising resin and a fiber portion comprising fibers of the panel. The component may comprise a trim panel, an instrument panel, a door panel.

20 Claims, 10 Drawing Sheets

Related U.S. Application Data

(60) Provisional application No. 62/357,326, filed on Jun. 30, 2016.

(51) Int. Cl.
    *B29L 31/30*     (2006.01)
    *B60R 21/205*     (2011.01)

(56) References Cited

U.S. PATENT DOCUMENTS

| | | | |
|---|---|---|---|
| 5,683,796 A | 11/1997 | Komylo et al. | |
| 5,779,262 A | 7/1998 | Totani et al. | |
| 6,726,239 B1* | 4/2004 | Teranishi | B60R 21/2165 |
| | | | 280/728.3 |
| 7,556,285 B1* | 7/2009 | Hayashi | B60R 21/2165 |
| | | | 280/728.3 |
| 7,665,758 B2* | 2/2010 | Hayashi | B60R 21/2165 |
| | | | 280/728.3 |
| 7,862,070 B2* | 1/2011 | Steinke | B29C 45/14065 |
| | | | 280/728.3 |
| 7,934,745 B2* | 5/2011 | Hayashi | B60R 21/2165 |
| | | | 280/728.3 |
| 8,262,126 B2* | 9/2012 | Matsushima | B60R 21/206 |
| | | | 280/728.2 |
| 8,985,621 B2* | 3/2015 | Scharf | B32B 5/024 |
| | | | 280/728.3 |
| 10,464,280 B2* | 11/2019 | Fox | B29C 43/02 |
| 2002/0000711 A1 | 1/2002 | Schmidt et al. | |
| 2004/0043187 A1 | 3/2004 | Ota et al. | |
| 2005/0269804 A1 | 12/2005 | Yamada et al. | |
| 2009/0066068 A1 | 3/2009 | Kanno | |
| 2009/0288542 A1 | 11/2009 | Matsuno | |
| 2012/0091698 A1* | 4/2012 | Wolfe | B32B 38/0004 |
| | | | 280/732 |

FOREIGN PATENT DOCUMENTS

| | | |
|---|---|---|
| EP | 0779185 A3 | 12/1999 |
| EP | 1970183 B1 | 11/2011 |
| JP | 2009233994 A | 10/2009 |

OTHER PUBLICATIONS

Extended European search report from the European Patent Office for EP Patent Application No. 17820953.2 dated Dec. 13, 2019 (in English) (7 Pages).

Communication from the Examining Division from the European Patent Office for EP Patent Application No. 17820953.2 dated Sep. 11, 2020 (in English) (5 Pages).

\* cited by examiner

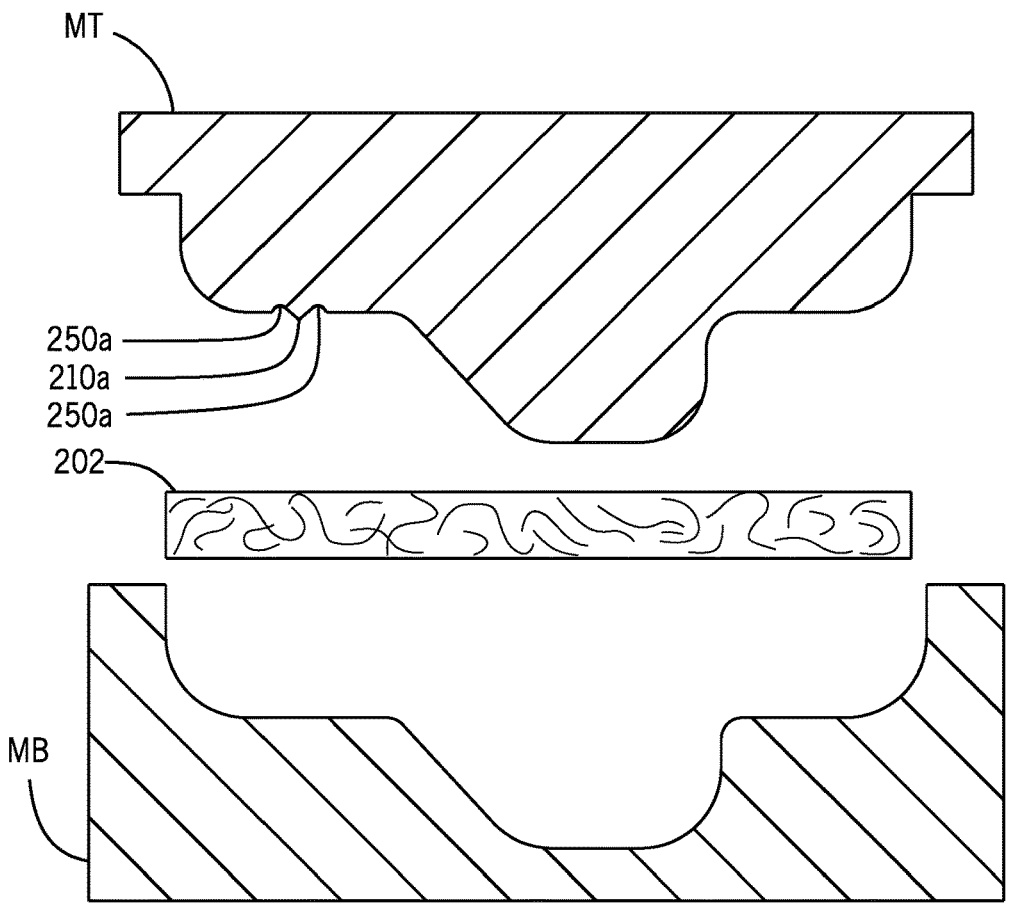
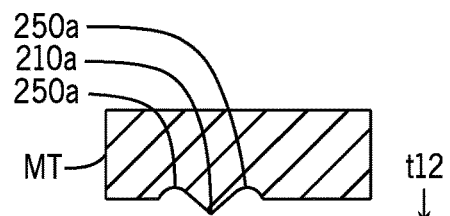
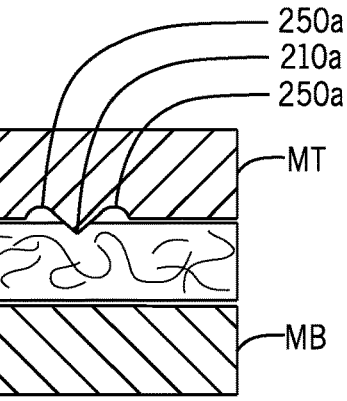
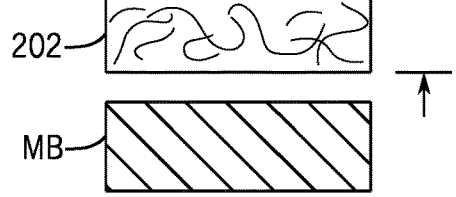
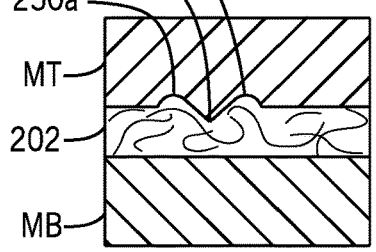
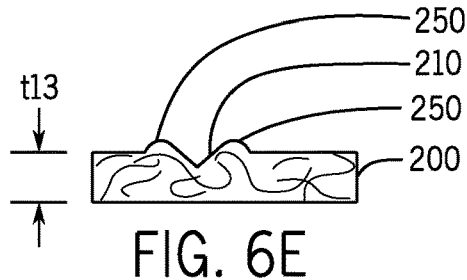

VEHICLE INTERIOR COMPONENT

CROSS-REFERENCE TO RELATED APPLICATIONS

The present application is a continuation of International/PCT Patent Application No. PCT/US2017/038572 titled "TRIM COMPONENT FOR VEHICLE INTERIOR" filed Jun. 21, 2017, which claims the benefit of U.S. Provisional Patent Application No. 62/357,326 titled "TRIM COMPONENT FOR VEHICLE INTERIOR" filed Jun. 30, 2016.

The present application claims priority to and incorporates by reference in full the following patent application(s): (a) U.S. Provisional Patent Application No. 62/357,326 titled "TRIM COMPONENT FOR VEHICLE INTERIOR" filed Jun. 30, 2016; (b) International/PCT Patent Application No. PCT/US2017/038572 titled "TRIM COMPONENT FOR VEHICLE INTERIOR" filed Jun. 21, 2017.

The present application is related to and incorporates by reference the following patent application(s): (a) U.S. Provisional Patent Application No. 61/528,832 titled "SYSTEM AND METHOD FOR MANUFACTURING A VEHICLE TRIM COMPONENT VIA CONCURRENT COMPRESSION FORMING AND INJECTION MOLDING" filed Aug. 30, 2011; (b) International/PCT Patent Application No. PCT/US2012/052534 titled "SYSTEM AND METHOD FOR MANUFACTURING A VEHICLE TRIM COMPONENT VIA CONCURRENT COMPRESSION FORMING AND INJECTION MOLDING" filed Aug. 27, 2012; (c) U.S. patent application Ser. No. 13/595,741 titled "SYSTEM AND METHOD FOR MANUFACTURING A VEHICLE TRIM COMPONENT VIA CONCURRENT COMPRESSION FORMING AND INJECTION MOLDING" filed Aug. 27, 2012 (now U.S. Pat. No. 8,939,745); (d) U.S. patent application Ser. No. 13/846,529 titled "SYSTEM AND METHOD FOR MANUFACTURING A VEHICLE TRIM COMPONENT VIA CONCURRENT COMPRESSION FORMING AND INJECTION MOLDING" filed Mar. 18, 2013 (now U.S. Pat. No. 9,149,961); (e) U.S. patent application Ser. No. 14/808,938 titled "VEHICLE TRIM COMPONENT" filed Jul. 24, 2015 (now U.S. Pat. No. 10,118,325); (f) U.S. patent application Ser. No. 15/459,894 titled "TRIM COMPONENT FOR VEHICLE INTERIOR" filed Mar. 15, 2017; (g) U.S. patent application Ser. No. 15/995,621 titled "VEHICLE TRIM COMPONENT" filed Jun. 1, 2018.

FIELD

The present invention relates to a vehicle interior component.

The present invention relates to a vehicle interior component a method of manufacturing a vehicle interior component.

BACKGROUND

It is known to provide a trim component (e.g. trim panel) for a vehicle interior. Interior trim components are commonly provided as headliners, door panels, instrument panels, center consoles, and various other components in a vehicle. It is also known in vehicles to provide airbags behind the trim component. It is further known to provide a weakened area such as a score line in the trim component to direct the airbag during an airbag deployment process. It is further known to form the trim component by a compression forming process.

It would be advantageous to provide an improved trim component (e.g. trim panel, instrument panel, or door panel) for a vehicle interior providing an exit for deployment of an airbag. It would also be advantageous to provide an improved trim component for a vehicle interior with an exit for deployment of an airbag that is not readily perceptible (e.g. having a smooth visible surface) from the vehicle interior. It would further be advantageous to provide an improved trim component with reduced break-through energy to facilitate effective airbag deployment. It would further be advantageous to manufacture an improved trim component in a single mold apparatus.

SUMMARY

The present invention relates to a vehicle interior component configured to facilitate deployment of an airbag from an airbag module comprising a panel comprising fibers. The panel may comprise a first side and a second side; the panel may comprise a notch formed as a depression in the first side of the panel; the panel may comprise at least one feature at the first side of the panel adjacent the notch; the second side of the panel may comprise a substantially planar surface opposite the notch. The panel may comprise at least one of a resin, a thermoplastic resin, polypropylene, acrylonitrile butadiene styrene, polycarbonate. The notch may be configured to direct deployment of the airbag through the panel. The feature may comprise a protrusion configured to provide a relief for the notch. The vehicle interior component may comprise a rib adjacent the notch. The rib may be configured to direct deployment of the airbag through the panel. The rib may be formed on the panel; the rib may comprise resin. The feature may comprise a rib configured to direct deployment of the airbag through the panel. The rib may be formed on the panel. The rib may comprise a resin portion comprising resin and a fiber portion comprising fibers of the panel.

The present invention relates to a vehicle interior component configured to facilitate deployment of an airbag from an airbag module comprising a panel comprising fibers. The panel may comprise a front side and a rear side. The panel may comprise a first portion comprising a first thickness, a second portion comprising a second thickness less than the first thickness and a third portion comprising a third thickness greater than the first thickness. The second portion of the panel may comprise a notch formed as a depression in the rear side of the panel and configured to direct deployment of the airbag through the panel. The first portion, the second portion and the third portion may comprise a substantially constant density. The first portion, the second portion and the third portion may comprise a substantially continuous surface at the front side of the panel. The third portion may extend from the second portion. The third portion may be adjacent the second portion. The second portion and the third portion may be formed concurrently. The third portion may be formed in response to formation of the second portion. The vehicle interior component may comprise a rib formed on the panel adjacent the notch.

The present invention relates to a method of manufacturing a vehicle interior component comprising providing a mold comprising a first surface and a second surface comprising a protrusion and a depression, disposing a fiber panel comprising a first side and a second side onto the first surface of a mold, compressing at least a first portion of the fiber panel between the first surface and the second surface of the mold, penetrating material of the fiber panel at the first side of the panel with the protrusion of the second surface of the mold to push material of the fiber panel aside to form a notch in the first side of the fiber panel and maintain a continuous surface at the second side of the fiber panel and filling the depression of the second surface of the mold with material of the fiber panel to form a protrusion at the first side of the fiber panel. The method may further comprise a step of injecting resin into the mold at the depression of the second surface of the mold to form a rib. The step of injecting resin into the mold may comprise moving material of the fiber panel toward the second surface of the fiber panel. The notch may be configured to establish an opening in the vehicle interior component for deployment of an airbag through the vehicle interior component.

The present invention relates to a vehicle interior component configured to support an airbag module providing an airbag and comprising a panel comprised of fibers; the panel may comprise a notch and at least one feature adjacent the notch. The notch may be configured to direct deployment of the airbag through the panel. The feature may comprise a protrusion configured to provide a relief for the notch. The protrusion may be configured to direct deployment of the airbag through the panel. The vehicle interior component may comprise a rib adjacent the notch; the rib may be configured to direct deployment of the airbag through the panel. The rib may be formed on the panel; the rib may comprise resin. The feature may comprise a rib configured to direct deployment of the airbag through the panel. The rib may be formed on the panel; the rib may comprise a resin portion comprising resin and a fiber portion comprising fibers of the panel.

The present invention also relates to a vehicle interior component configured to support an airbag module providing an airbag and comprising a panel comprised of fibers. The panel may comprise a first portion comprising a first thickness, a second portion comprising a second thickness, and a third portion comprising a third thickness. The first portion of the panel may comprise a majority of the panel; the second thickness may be less than the first thickness; the third thickness may be greater than the first thickness. The second portion of the panel may be configured to direct deployment of the airbag through the panel. The first portion, the second portion and the third portion may comprise a substantially constant density. The third portion may extend from the second portion; the third portion may be adjacent the second portion. The second portion and the third portion may be formed concurrently. The third portion may be formed in response to formation of the second portion.

The present invention also relates to a vehicle interior component prepared by a process comprising: (a) disposing a fiber panel onto a first surface of a mold; (b) compressing a first portion of the fiber panel between the first surface and a second surface of the mold to form the fiber panel into a compression formed component; (c) forming a second portion of the fiber panel between the first surface and the second surface of the mold to form a notch in the compression formed component and at least one protrusion in the compression formed component; (d) removing the vehicle interior component from the mold cavity. The at least one protrusion may be formed in response to forming of the notch; the notch and the protrusion may be configured to direct deployment of an airbag through the vehicle interior component. The vehicle interior component may comprise injecting resin into the mold to at least partially fill at least one void between the second surface of the mold and an uncompressed portion of the compression formed component to form a rib coupled to the compression formed component; the resin may be injected after the compression formed component is formed. The resin may combine with the uncompressed portion of the compression formed component to form the rib; the rib may be configured to direct deployment of an airbag through the vehicle interior component. The notch may be formed by a mold protrusion formed on the second surface of the mold and the protrusion may be formed by a recess formed on the second surface of the mold.

The present invention also relates to a method of manufacturing a vehicle interior component comprising: (a) providing a mold comprising a first surface and a second surface comprising a protrusion and a depression; (b) disposing a fiber panel onto the first surface of a mold; (c) compressing at least a first portion of the fiber panel between the first surface and the second surface of the mold; (d) moving a second portion of the fiber panel with the protrusion of the second surface of the mold to form a notch in the fiber panel; (e) filling the depression of the second surface of the mold with the second portion of the fiber panel to form a protrusion in the fiber panel; (f) removing the vehicle interior component from the mold cavity. The notch may be configured to establish an opening in the vehicle interior component for deployment of an airbag through the vehicle interior component.

The present invention further relates to a vehicle interior component comprising a panel comprised of fibers; the panel may comprise a visible side and a non-visible side. The panel may be configured to support an airbag module providing an airbag on the non-visible side of the panel. The panel may comprise a notch and at least one feature adjacent the notch; the notch and the at least one feature may be formed on the non-visible side of the panel. The visible side may comprise a smooth visible surface; the feature may be configured to direct deployment of the airbag through the panel.

FIGURES

FIGS. 6A to 6E are schematic cross-section views of a molding process for a vehicle interior trim component according to an exemplary embodiment.

DESCRIPTION

Figure 1A:
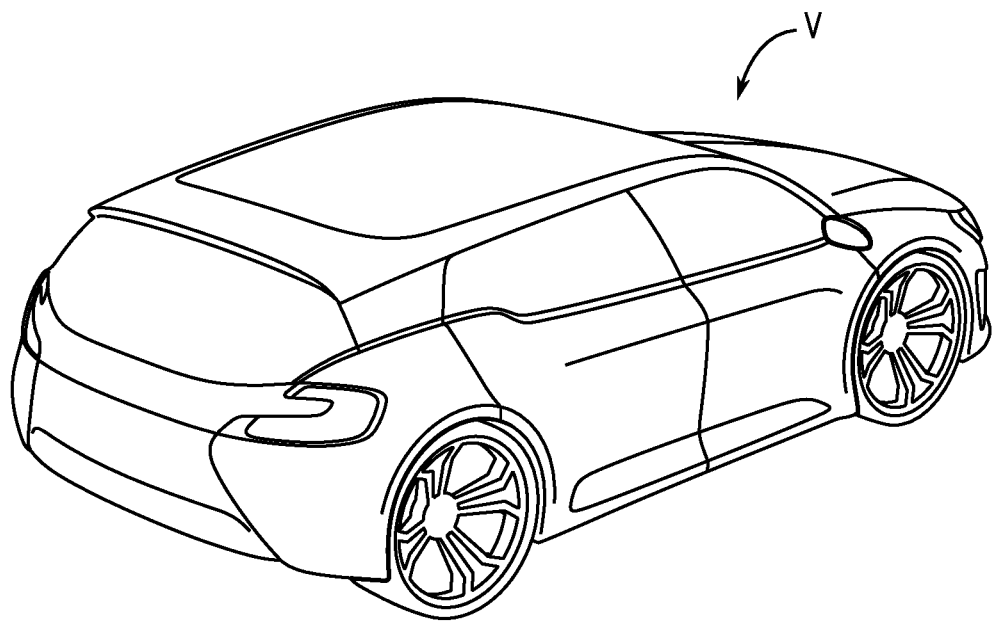
FIG. 1A is a schematic perspective view of a vehicle according to an exemplary embodiment.
Figure 1B:
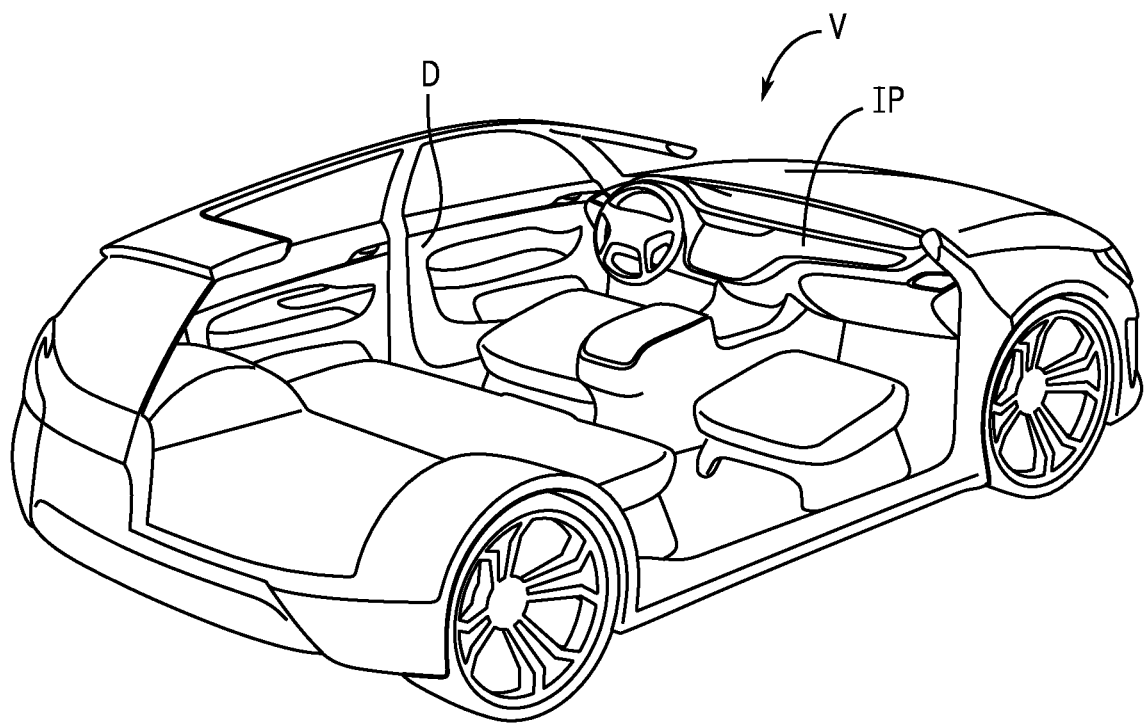
FIG. 1B is a schematic perspective cut-away view of a vehicle showing a vehicle interior according to an exemplary embodiment.

Referring to FIGS. 1A and 1B, a vehicle V is shown including an interior with an instrument panel IP and doors D. According to an exemplary embodiment, interior components of vehicle V such as instrument panel IP and doors D may include trim panels made with a mixture of fiber and plastic. According to an exemplary embodiment, instrument panel IP and doors D may provide visible surfaces in the vehicle interior of vehicle V. According to an exemplary embodiment, instrument panel IP and/or doors D may provide at least one airbag behind the visible surfaces; instrument panel IP and/or doors D may provide a weakened area to aid the airbag in breaking through the trim panel during airbag deployment. See FIGS. 2A to 2E.

Figure 2A:
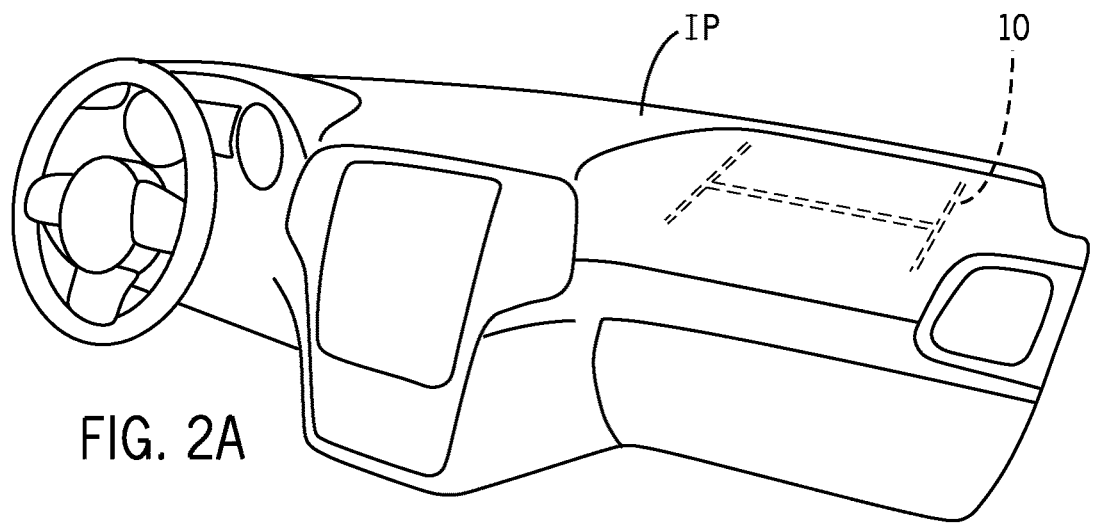
FIG. 2A is a schematic perspective view of an instrument panel for a vehicle interior showing an airbag exit according to an exemplary embodiment.
Figure 2B:
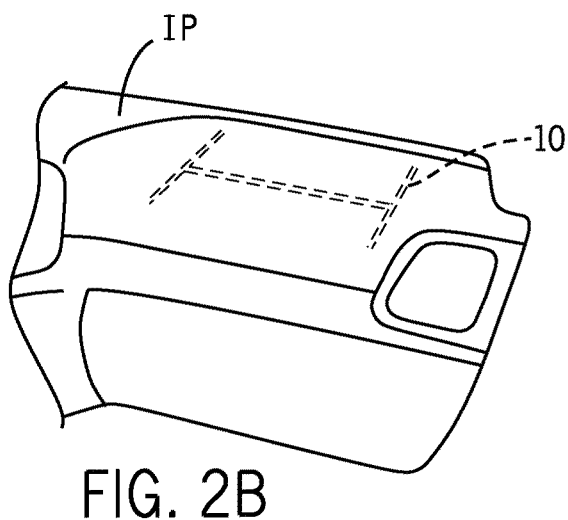
FIG. 2B is a schematic perspective detail view of an instrument panel for a vehicle interior showing an airbag exit according to an exemplary embodiment.

According to an exemplary embodiment as shown schematically in FIGS. 2A and 2B, instrument panel IP may provide a weakened shape/zone shown as an airbag exit 10 to facilitate the airbag deployment. According to an exemplary embodiment, the airbag exit 10 may be weakened by providing a score line behind the visible surface of instrument panel IP. As shown schematically in FIGS. 2A to 2C, airbag exit 10 may include an "H" shape pattern. According to an exemplary embodiment, the airbag exit may have a "U" shape pattern, a "bow tie" shape pattern, or any pattern suitable for airbag deployment.

Figure 2C:
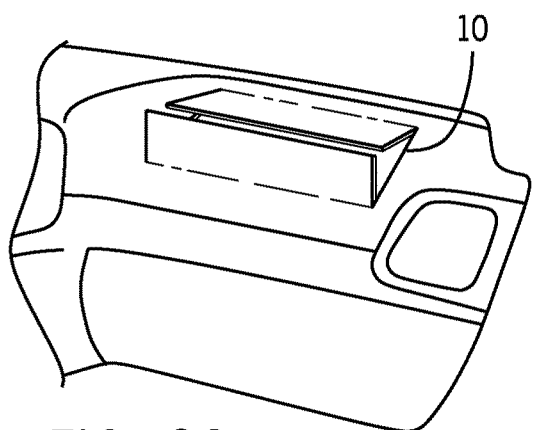
FIGS. 2C to 2E are schematic perspective detail views of an airbag deployment process according to an exemplary embodiment.
Figure 2D:
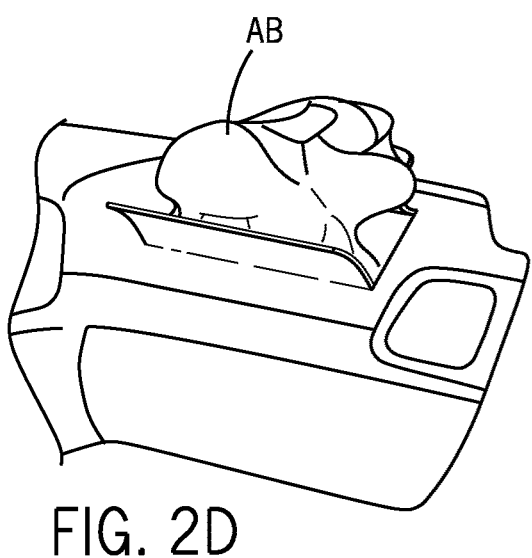
Figure 2E:
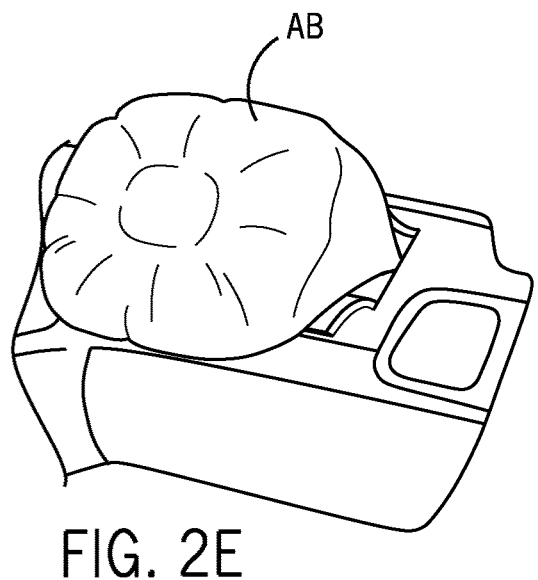

According to an exemplary embodiment as shown schematically in FIG. 2C, airbag exit 10 may partially open during airbag deployment. According to an exemplary embodiment as shown schematically in FIG. 2D, an airbag AB may deploy through an opening generated through the airbag exit 10 (i.e. the weakened area) on the instrument panel IP. FIG. 2D illustrates airbag AB as being partially inflated according to an exemplary embodiment. According to an exemplary embodiment as shown schematically in FIG. 2E, airbag AB may fully inflate through the opening on instrument panel IP.

According to an exemplary embodiment as shown schematically in FIGS. 3A-3C, 4A-4E, 5A-5D, 6A-6E, 7A-7F, 8A-8F and 9A-9B, a vehicle interior component configured to facilitate deployment of an airbag from an airbag module may comprise a panel comprising fibers. As shown schematically in FIGS. 5A-5B, the component 200 may comprise a substrate/panel shown as mat 202; as shown schematically in FIG. 5C, the component 300 may comprise a substrate/panel shown as mat 302; as shown in FIG. 5D, the component 400 may comprise a substrate/panel shown as mat 402. The panel may comprise a rear side and a front/facing side and a notch formed in the rear side (e.g. notch 210 in panel 202 or notch 310 in panel 302 or notch 410 in panel 402) as a depression; the panel may comprise at least one feature (e.g. features 250 in panel 202 or features 350/360 in panel 302 or features 460 in panel 402) adjacent to the notch (e.g. notch 210 in panel 202 or notch 310 in panel 302 or notch 410 in panel 402); the front/facing side of the panel may comprise a substantially planar surface (e.g. surface 200v in panel 202 or surface 300v in panel 302 or surface 400v in panel 402) opposite the notch on the rear side of the panel (e.g. notch 210 or notch 310 or notch 410). See FIGS. 5A-5D. The panel may comprise at least one of a resin, a thermoplastic resin, polypropylene, acrylonitrile butadiene styrene, polycarbonate. As shown schematically in FIGS. 2A-2E, the notch (e.g. notch 210 in FIGS. 5A-5B or notch 310 in FIG. 5C or notch 410 in FIG. 5D) may be configured to direct deployment of the airbag through the panel. The feature adjacent to the notch may comprise a protrusion configured to provide a relief for material flow in formation of the notch (e.g. rib features 250 in panel 202 or rib features 350/360 in panel 302 or rib features 460 in panel 402). See FIGS. 5A-5D. The rib/feature adjacent to the notch may be configured to facilitate/direct deployment of the airbag through the panel (e.g. directed through an opening established by the notch in the panel). As indicated schematically in FIGS. 5C and 5D, rib features 360/460 formed on the panel may comprise resin; rib 460 may comprise a resin portion comprising resin and a fiber portion comprising fibers of the panel. See FIGS. 5D and 8E-8F.

According to an exemplary embodiment as shown schematically in FIGS. 3A-3C, 4A-4E, 5A-5D, 6A-6E, 7A-7F, 8A-8F and 9A-9B, a vehicle interior component configured to facilitate deployment of an airbag from an airbag module may comprise a panel comprising fibers (e.g. substrate/panel 202 or substrate/panel 302 or substrate/panel 402). The panel may comprise a front side and a rear side. The panel may comprise a first portion comprising a first thickness t3, a second portion comprising a second thickness (e.g. t4 in panel 202 or t6 in panel 302 or t10 in panel 402) less than first thickness t3 and a third portion comprising a third thickness (e.g. t5 in panel 202 or t7 in panel 302) greater than first thickness t3. See FIGS. 5A-5D. The second portion of the panel may comprise a notch formed as a depression in the rear side of the panel and configured to direct deployment of the airbag through the panel (e.g. notch 210 or notch 310 or notch 410). The first portion and the second portion and the third portion of the panel may comprise a substantially constant density. The first portion and the second portion and the third portion may comprise a substantially continuous surface (e.g. surface 200v on panel 202 or surface 300v on panel 302 or surface 400v on panel 402) at the front side of the panel. The third portion may extend from the second portion; the third portion may be adjacent the second portion. The second portion and the third portion may be formed concurrently. See FIGS. 6C-6E, 7B-7C and 8B-8C. The third portion may be formed in response to formation of the second portion. The feature adjacent to the notch may comprise a protrusion configured to provide a relief for material flow in formation of the notch (e.g. rib features 250 in panel 202 or rib features 350/360 in panel 302 or rib features 460 in panel 402) configured to facilitate/direct deployment of the airbag through the panel (e.g. directed through an opening established by the notch in the panel). See FIGS. 5A-5D, 7D-7F, 8D-8F and 9B.

According to an exemplary embodiment as shown schematically in FIGS. 3A-3C, 4A-4E, 5A-5D, 6A-6E, 7A-7F, 8A-8F and 9A-9B, a method of manufacturing a vehicle interior component may comprise providing a mold comprising a first surface and a second surface comprising a protrusion and a depression, disposing a fiber panel comprising a first side and a second side onto the first surface of a mold, compressing at least a first portion of the fiber panel between the first surface and the second surface of the mold, penetrating material of the fiber panel at the first side of the panel with the protrusion of the second surface of the mold to push material of the fiber panel aside to form a notch in the first side of the fiber panel and maintain a continuous surface at the second side of the fiber panel and filling the depression of the second surface of the mold with material of the fiber panel to form a protrusion at the first side of the fiber panel. The method may further comprise a step of injecting resin into the mold at the depression of the second surface of the mold to form a rib. The step of injecting resin into the mold may comprise moving material of the fiber panel toward the second surface of the fiber panel. The notch may be configured to establish an opening in the vehicle interior component for deployment of an airbag through the vehicle interior component.

Figure 3A:
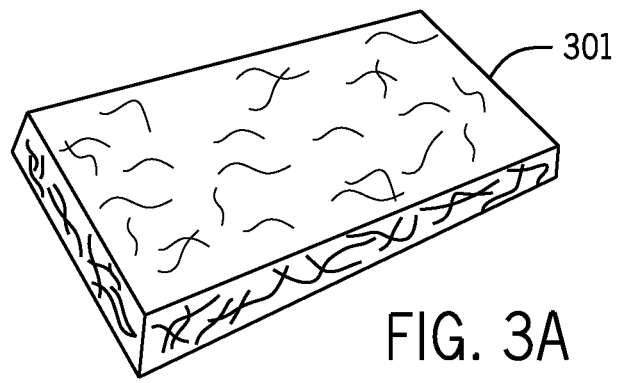
FIGS. 3A to 3C are schematic perspective views of a fiber mat being trimmed and compressed into a compressed fiber mat according to an exemplary embodiment.
Figure 3B:
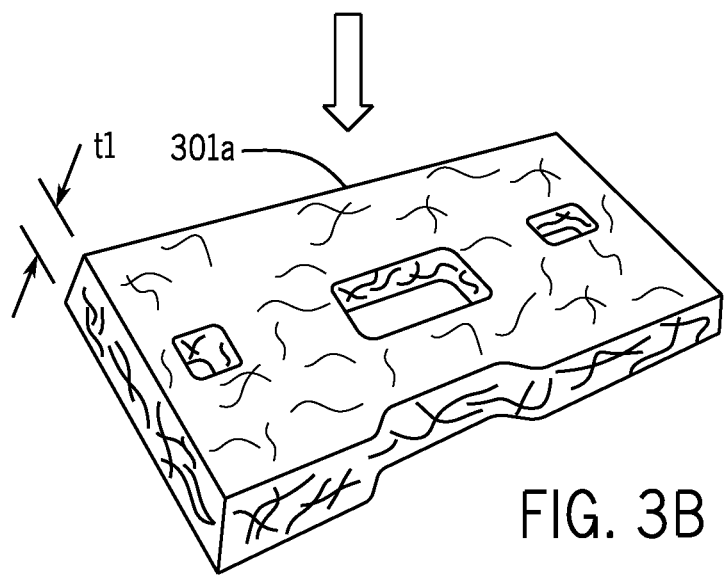
Figure 3C:
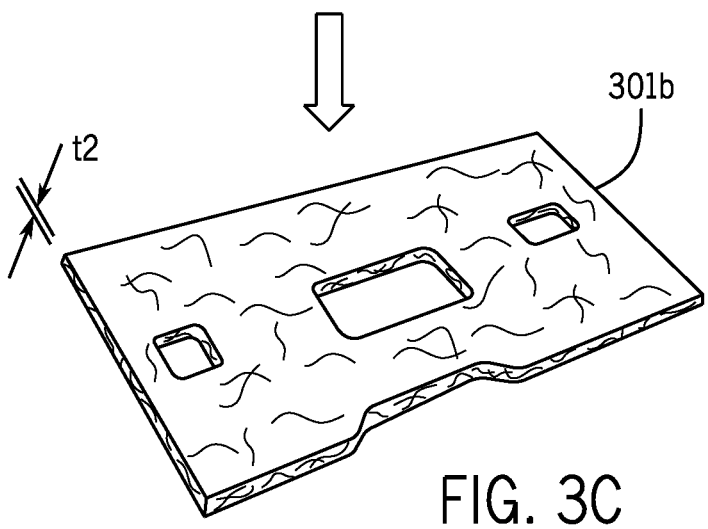

According to an exemplary embodiment as shown schematically in FIG. 3A, a fiber mat 301 may include a combination of fibers (e.g. natural and/or synthetic fibers) and thermoplastic resin (e.g. polypropylene (PP), acrylonitrile butadiene styrene (ABS), polycarbonate (PC), etc.). According to an exemplary embodiment as shown schematically in FIG. 3B, fiber mat 301 may be trimmed into a fiber mat 301a; the instrument panel IP may comprise the trimmed fiber mat 301a. According to an exemplary embodiment, the trimmed fiber mat 301a may have a thickness t1. According to an exemplary embodiment, fiber mat 301a may be heated to induce the thermoplastic resin to liquefy. According to an exemplary embodiment as shown schematically in FIG. 3C, fiber mat 301a may be heated and partially compressed into a compressed fiber mat 301b. According to an exemplary embodiment, fiber mat 301a may be placed into a low-temperature mold and compression molded into a desired shape. According to an exemplary embodiment, as compressed fiber mat 301b cools, the thermoplastic within fiber mat 301b solidifies to establish a substantially rigid composite panel. According to an exemplary embodiment, the compressed fiber mat 301b may have a thickness t2, which may be smaller than the thickness t1.

According to an exemplary embodiment, fiber mat 301a may include a combination of structural fibers and thermoset resin (e.g. epoxy, polyester, etc.). According to an exemplary embodiment, fiber mat 301a may be compressed within a heated mold to form a partially compressed fiber mat 301b with a desired shape and to induce curing of the thermoset resin. According to an exemplary embodiment, a substantially rigid composite panel may be formed after the thermoset resin is cured.

Figure 4A:
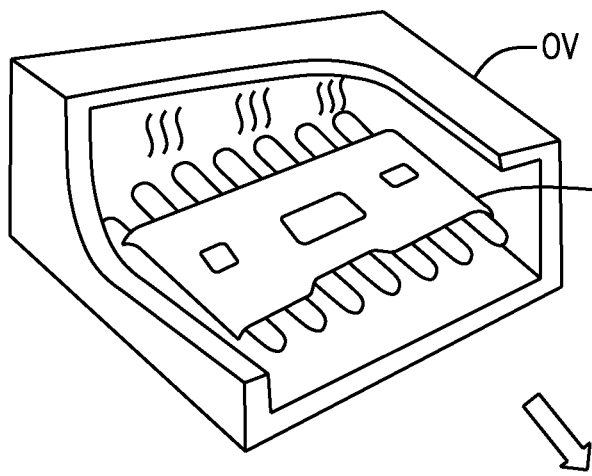
FIGS. 4A to 4C are schematic perspective views of a compressed fiber mat formed into an instrument panel according to an exemplary embodiment.
Figure 4B:
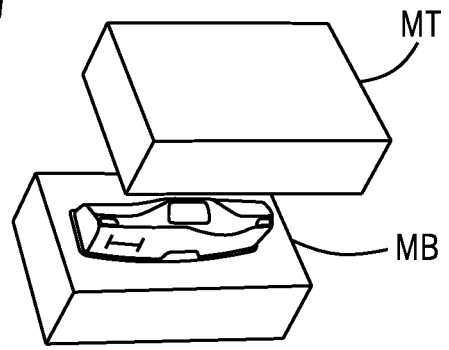
Figure 4C:
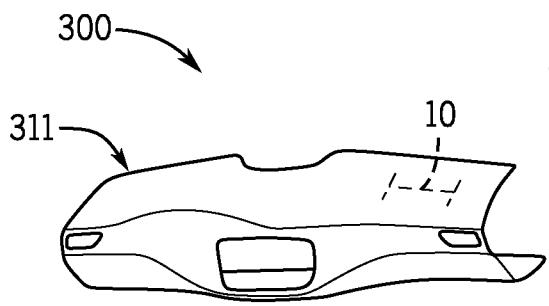
Figure 4D:
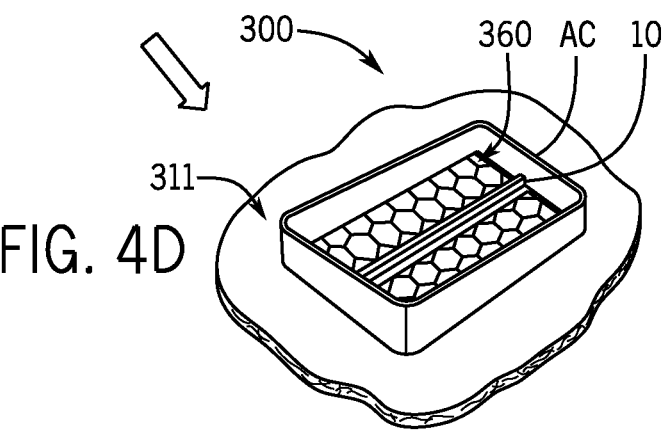
FIGS. 4D and 4E are schematic perspective detail views of ancillary features on an instrument panel according to an exemplary embodiment.
Figure 4E:
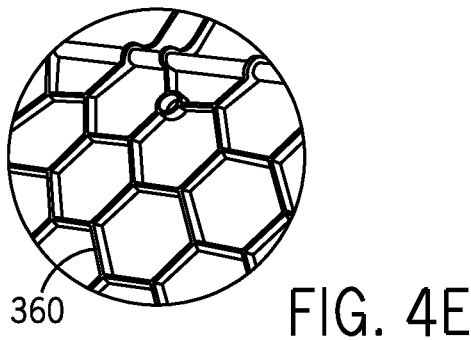

According to an exemplary embodiment as shown schematically in FIG. 4A, a compressed fiber mat 302 may be heated in an oven OV. As shown schematically in FIG. 4B, the hot compressed fiber mat 302 may be transferred into a mold having a mold top MT NS mold bottom MB. According to an exemplary embodiment as shown schematically in FIG. 4C, a trim component shown as an instrument panel 300 may be produced by a process of concurrent compression forming and injection molding. According to an exemplary embodiment, the heated compressed fiber mat 302 may be further compressed into a fiber panel 311; plastic resin may be injected on the back side of fiber panel 311 to form an ancillary feature shown as an airbag exit 10. According to an exemplary embodiment as shown schematically in FIG. 4C, instrument panel 300 may provide airbag exit 10 configured to facilitate airbag deployment. According to an exemplary embodiment as shown schematically in FIGS. 4D and 4E, instrument panel 300 may provide ancillary features shown as plastic ribs 360 on the backside of fiber panel 311 to improve structural integrity and rigidity. According to an exemplary embodiment, the fiber panel 311 may be configured to support an airbag chute AC (i.e. airbag module) comprising an airbag. As shown schematically in FIG. 4D, plastic ribs 360 may be placed on the backside of the airbag exit 10 to provide structural support for the airbag chute AC. According to an exemplary embodiment, a plastic rib 360 may be placed at any location on the backside of a fiber panel (e.g. along the edge of the fiber panel 311, in the middle of the fiber panel 311, etc.). According to an exemplary embodiment, multiple plastic ribs 360 may be placed at various different locations on the backside of a fiber panel 311.

According to an exemplary embodiment, plastic ribs 360 may improve structural integrity of instrument panel 300. According to an exemplary embodiment, instrument panel 300 may be able to maintain structural integrity during an airbag deployment; the position/placement of plastic ribs 360 may be intended to create a strength differential between different areas of instrument panel 300; energy needed for airbag to break through instrument panel 300 may be directed to the airbag exit 10 on instrument panel 300; plastic ribs 360 on the backside of instrument panel 300 may help prevent or minimize instrument panel 300 from ripping or tearing at any location other than the airbag exit 10 (i.e. score line) during an airbag deployment. According to an exemplary embodiment as shown schematically in FIG. 4E, plastic ribs 360 on the backside of fiber panel 311 may form a honeycomb shaped pattern to improve structural integrity and rigidity. According to an exemplary embodiment, the plastic ribs 360 may be formed in any configuration according to the specific application (e.g. ancillary features for attaching air vents, speakers or infotainment system, etc.).

Figure 5A:
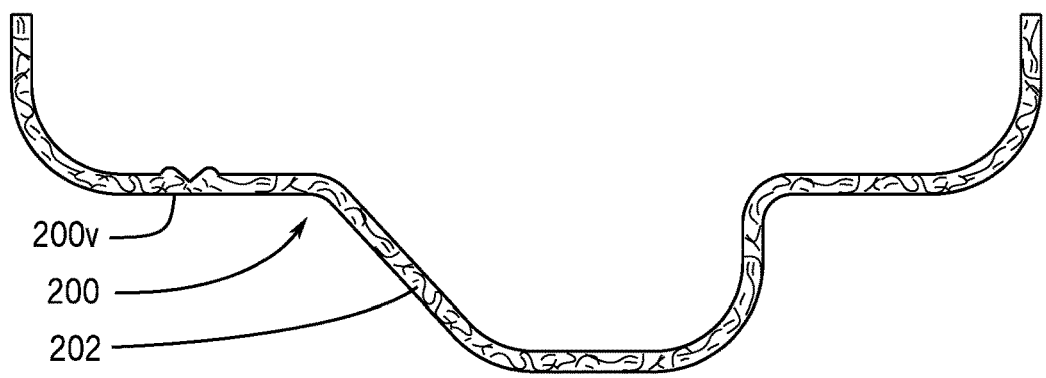
FIG. 5A is a schematic cross-section view of a vehicle interior trim component according to an exemplary embodiment.

According to an exemplary embodiment, the trim panel shown as an instrument panel 200 is shown schematically in FIG. 5A. According to an exemplary embodiment, instrument panel 200 may comprise a compressed fiber mat and a visible surface 200v. According to an exemplary embodiment, the visible surface 200v may include a cover, such as leather or other aesthetically-pleasing material.

Figure 5B:
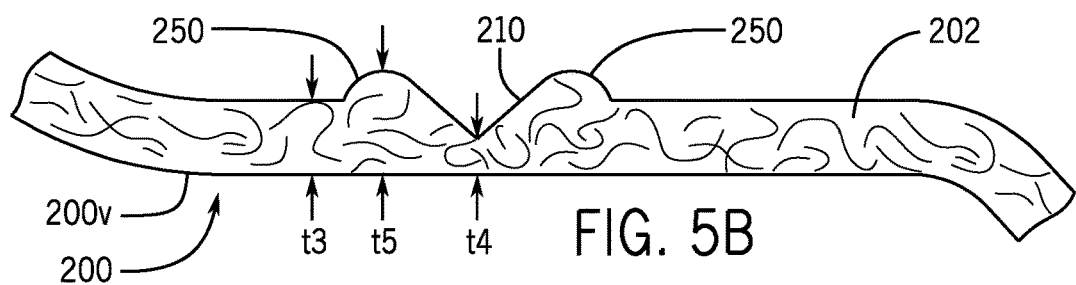
FIGS. 5B to 5D are schematic partial cross-section views of a vehicle interior trim component according to an exemplary embodiment.
Figure 5C:
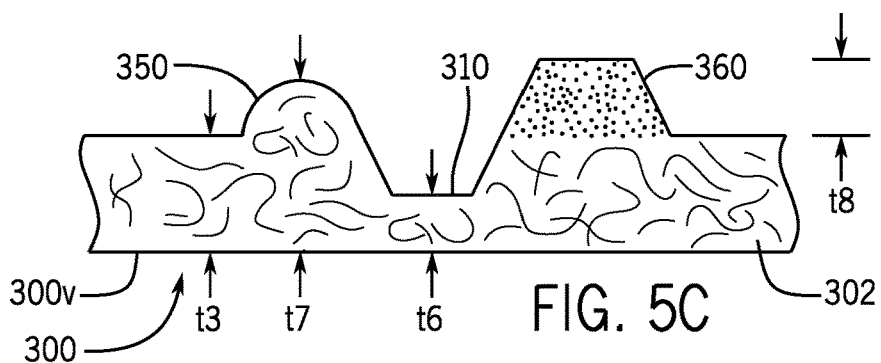
Figure 5D:
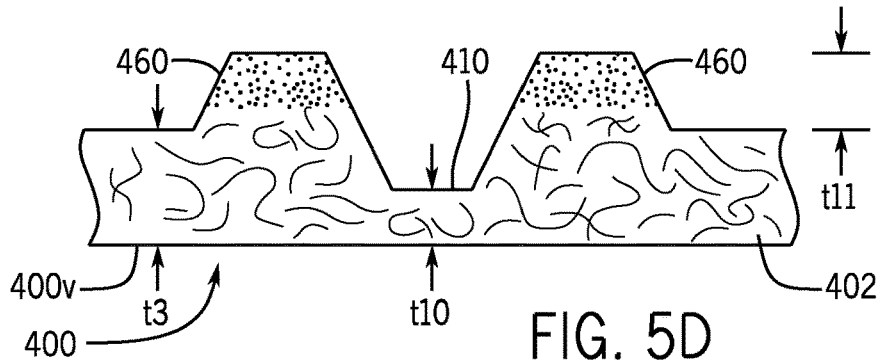

According to an exemplary embodiment, an instrument panel 200 is shown schematically in FIG. 5B. According to an exemplary embodiment, instrument panel 200 may comprise a compressed fiber mat. According to an exemplary embodiment as shown schematically in FIG. 5B, instrument panel 200 may provide a notch 210. According to an exemplary embodiment, the notch 210 may be configured to provide a weakened area within the instrument panel 200; the weakened area at the notch 210 may aid airbag deployment. According to an exemplary embodiment as shown schematically in FIG. 5B, the instrument panel 200 may also provide protrusions 250 (i.e. feature) behind the visible surface 200v of the instrument panel 200 adjacent to the notch 210. As shown schematically in FIG. 5B, the instrument panel 200 may have a smaller thickness t4 at the notch 210 than thickness t3 at positions on the instrument panel 200 other than at the notch 210 and the protrusions 250; the instrument panel 200 also may have a greater thickness t5 at protrusions 250 adjacent to notch 210 than thickness t3 at positions on the instrument panel 200 other than at the notch 210 and the protrusions 250; material at the notch 210 may be pushed aside during compression forming to protrusions 250 adjacent to notch 210; the protrusions 250 may provide relief for the notch 210. See also FIGS. 6B to 6E. According to an exemplary embodiment as shown schematically in FIG. 5B, the instrument panel 200 may have a substantially consistent density throughout. According to an exemplary embodiment, the smaller thickness t4 at notch 210 may reduce the strength of the local area at the notch 210; the greater thickness t5 at the protrusions 250 may increase the strength of the local areas adjacent to the notch 210; the strength differential between the notch 210 and the adjacent protrusions 250 may help directing the breakthrough of airbag towards the notch 210 during the airbag deployment process.

According to an exemplary embodiment, the instrument panel 200 may include a first portion having a first thickness t3, a second portion (notch 210) having a second thickness t4, and a third portion (protrusions 250) comprising a third thickness t5. According to an exemplary embodiment, the first portion may be a majority of the panel; the second thickness may be substantially less than the first thickness; the third thickness may be substantially greater than the first thickness; the second portion (protrusions 250) may be configured to direct deployment of the airbag through the instrument panel 200. According to an exemplary embodiment, the first portion, the second portion, and the third portion may comprise a substantially constant density. According to an exemplary embodiment, the third portion (protrusion 250) may extend from the second portion (notch 210); the third portion (protrusion 250) may be adjacent the second portion (notch 210); the third portion (protrusion 250) and the second portion (notch 210) may be formed concurrently; and third portion (protrusion 250) may be formed in response to formation of the second portion (notch 210).

According to an exemplary embodiment as shown schematically in FIG. 5B, the instrument panel 200 may provide a smooth visible surface 200v; additional material may not be required to cover the visible surface 200v of instrument panel 200. See also FIGS. 6A to 6E.

According to an exemplary embodiment, a trim panel shown as an instrument panel 300 may comprise a compressed fiber mat. See FIGS. 4A to 4E. As shown schematically in FIG. 5C, the instrument panel 300 may provide a depression 310. According to an exemplary embodiment, the depression 310 may be configured to provide a weakened area within the instrument panel 300; the weakened area at the depression 310 may aid airbag deployment. According to an exemplary embodiment as shown schematically in FIG. 5C, the instrument panel 300 may also provide a protrusion 350 and a rib 360 formed on the instrument panel 300 behind a visible surface 300v of the instrument panel 300 adjacent to the depression 310. According to an exemplary embodiment, resin may be injection molded onto the backside of the instrument panel 300 to form the rib 360; the rib 360 may comprise a resin portion that may comprise resin and a fiber portion that may comprise fibers of the instrument panel 300. See also FIGS. 7D to 7F. According to an exemplary embodiment as shown schematically in FIG. 5C, the instrument panel 300 may have a smaller thickness t6 at the depression 310 than thickness t3 at positions on the instrument panel 300 other than at the depression 310, the protrusion 350, and the rib 360; the instrument panel 300 also has a greater thickness t7 at protrusion 350 than thickness t3 at positions on the instrument panel 200 other than at the depression 310, the protrusion 350, and the rib 360; the rib 360 adjacent to the depression 310 may be formed to have a thickness t8; material at depression 310 may be pushed aside during compression forming toward protrusion 350 and rib 360 adjacent to depression 310. See also FIGS. 7D to 7F.

According to an exemplary embodiment, a trim panel shown as an instrument panel 400 may comprise a compressed fiber mat. See FIGS. 4A to 4E. As shown schematically in FIG. 5D according to an exemplary embodiment, the instrument panel 400 may provide a depression 410. According to an exemplary embodiment, the depression 410 may be configured to provide a weakened area within the instrument panel 400; the weakened area at the depression 410 may aid airbag deployment. According to an exemplary embodiment as shown schematically in FIG. 5D, the instrument panel 400 may also provide a rib 460 and a rib 460 behind a visible surface 400v of instrument panel 400 adjacent to depression 410. According to an exemplary embodiment, resin may be injection molded onto the backside of the instrument panel 400 to form the rib 460 and the rib 460. See also FIGS. 8D to 8F. According to an exemplary embodiment as shown schematically in FIG. 5D, the instrument panel 400 may have a smaller thickness t10 at the depression 410 than thickness t3 at positions on the instrument panel 400 other than at the depression 410 and the ribs 460; the rib 460 and the rib 460 adjacent to the depression 310 may be formed to have a thickness t11; material at depression 410 may be pushed aside during compression forming toward the ribs 460 adjacent to the depression 410. See also FIGS. 8D to 8F.

According to an exemplary embodiment as shown schematically in FIG. 6A, a mold apparatus may comprise a mold top MT and a mold bottom MB; a compressed fiber mat 202 having a thickness t12 may be placed between mold top MT and mold bottom MB. See also FIG. 4B.

According to an exemplary embodiment as shown schematically in FIGS. 6B to 6D, the compressed fiber mat 202 may be placed between the mold top MT and the mold bottom MB; the mold top MT and the mold bottom MB may move between an open position to a closed position; the compressed fiber mat 202 may be further compressed and shaped between the mold top MT and the mold bottom MB. According to an exemplary embodiment, the compressed fiber mat 202 may be heated prior to compression and forming. According to an exemplary embodiment as shown schematically in FIGS. 6A to 6D, the mold top MT may include a protrusion feature 210a and two depression features 250a adjacent to the protrusion feature 210a. As the compressed fiber mat 202 is being compressed, the protrusion 210a may push material on the compressed fiber mat 202 aside to form a notch 210 and protrusions 250 on the instrument panel 200. See FIG. 6E. According to an exemplary embodiment, excessive material around notch 210 on compressed fiber mat 202 may be pushed into the depressions 250a to form the protrusions 250 adjacent to the notch 210. See FIGS. 6C to 6E. According to an exemplary embodiment as shown schematically in FIG. 6E, the instrument panel 200 may be formed with the notch 210 and two protrusions 250 adjacent to the notch 210. See also FIG. 5D. According to an exemplary embodiment, the instrument panel 200 may comprise a thickness t13 at positions other than other than at the notch 210 and the protrusions 250; thickness t13 may be smaller than thickness t12.

Figure 7A:
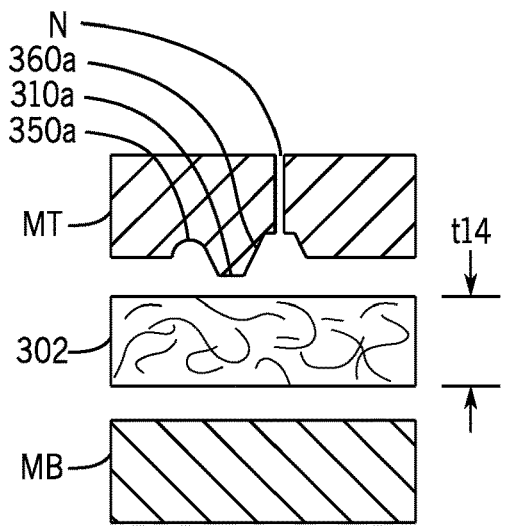
FIGS. 7A to 7F are schematic partial cross-section views of a molding process for a vehicle interior trim component according to an exemplary embodiment.

According to an exemplary embodiment as shown schematically in FIG. 7A, a mold apparatus may comprise a mold top MT and mold bottom MB; the mold top MT may further comprise a nozzle N to inject plastic resin into a mold cavity; a compressed fiber mat 302 having a thickness t14 may be placed between the mold top MT and the mold bottom MB.

Figure 7B:
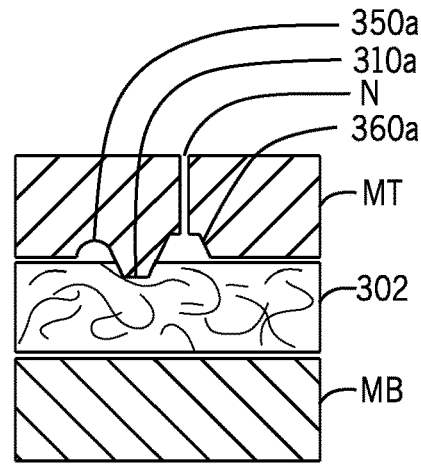
Figure 7C:
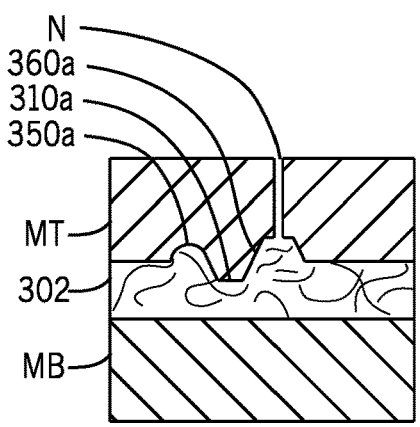
Figure 7D:
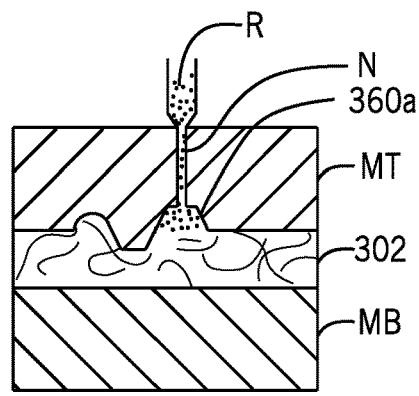
Figure 7E:
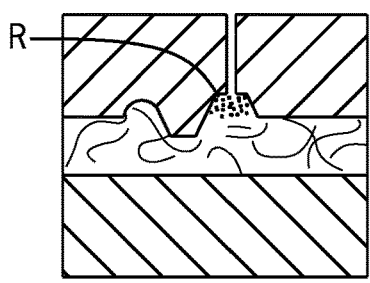
Figure 7F:
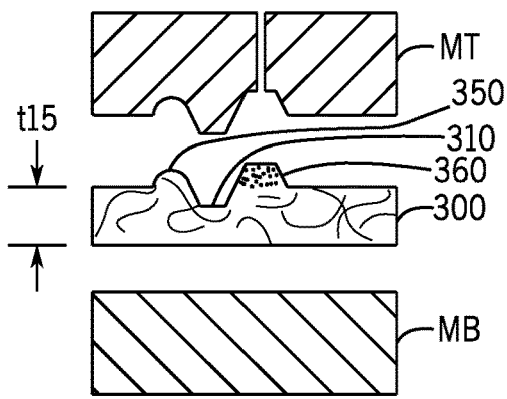

According to an exemplary embodiment as shown schematically in FIGS. 7A to 7C, the compressed fiber mat 302 may be placed between the mold top MT and the mold bottom MB; the mold top MT and the mold bottom MB may move between an open position and a closed position; the compressed fiber mat 302 may be further compressed between the mold top MT and the mold bottom MB. According to an exemplary embodiment, the compressed fiber mat 302 may be heated prior to compression and forming. According to an exemplary embodiment as shown schematically in FIGS. 7A to 7F, the mold top MT may include a protrusion feature 310a, a depression feature 350a adjacent to the protrusion feature, and a depression feature 360a on the opposing side of the depression feature 350a. According to an exemplary embodiment, as the compressed fiber mat 302 is further compressed within the mold cavity, the protrusion feature 310a may push material on the compressed fiber mat 302 aside to form the depression 310 on the instrument panel 300. See also FIG. 7F. As shown schematically in FIG. 7C, excess material around the depression 310 on the compressed fiber mat 302 may be pushed into the depression 350a and the depression feature 360a to form the protrusion 350 adjacent to the depression 310 and the rib 360 also adjacent to the depression 310. See also FIG. 7F. According to an exemplary embodiment as shown schematically in FIG. 7D, resin R may be injected onto the backside of the compressed fiber mat 302 through the nozzle N. According to an exemplary embodiment, the resin R may push down the excess material formed in the depression feature 360a. According to an exemplary embodiment as shown schematically in FIG. 7E, the resin R may cure and harden. As shown schematically in FIG. 7F, the instrument panel 300 may be formed with the depression 310, the protrusion 350 adjacent to the depression 310, and the rib 360 on the opposing side of the protrusion 350. See also FIG. 5C. According to an exemplary embodiment, as shown schematically in FIG. 7F, instrument panel 300 may have a substantially consistent density throughout. According to an exemplary embodiment, the smaller thickness at the depression 310 may reduce the strength of the local area at the depression 310; the greater thickness at the protrusion 350 may increase the strength of the local area adjacent to the depression 310; the resin rib 360 may increase the strength of the local area adjacent to the depression 310; the strength differential between depression 310 and the adjacent protrusion 350 and rib 360 may help directing the breakthrough energy of airbag towards depression 310 (i.e. the score line) during airbag deployment process. According to an exemplary embodiment as shown schematically in FIG. 7F, the instrument panel 300 may provide a smooth visible surface 300v; additional material may not be required to cover the visible surface 300v of instrument panel 300. According to an exemplary embodiment, the instrument panel 300 may comprise a thickness t15 at positions other than other than at the depression 310, the protrusion 350, and the rib 360; thickness t15 may be smaller than thickness t14.

Figure 8A:
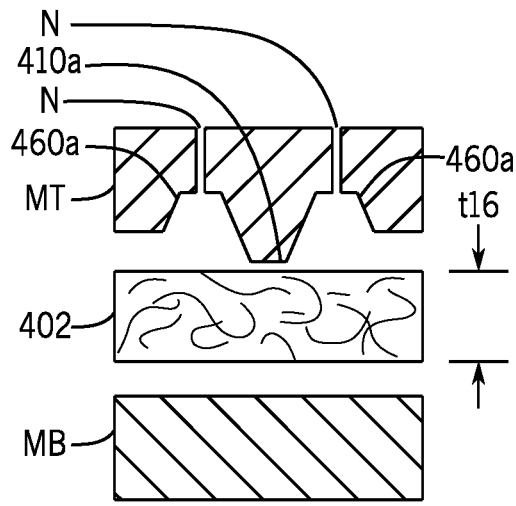
FIGS. 8A to 8F are schematic partial cross-section views of a molding process for a vehicle interior trim component according to an exemplary embodiment.

As shown schematically in FIG. 8A, a mold apparatus may comprise mold top MT and mold bottom MB; the mold top MT may further comprises two nozzles N to inject plastic resin into a mold cavity; a compressed fiber mat 402 having a thickness t16 may be placed between the mold top MT and the mold bottom MB.

Figure 8B:
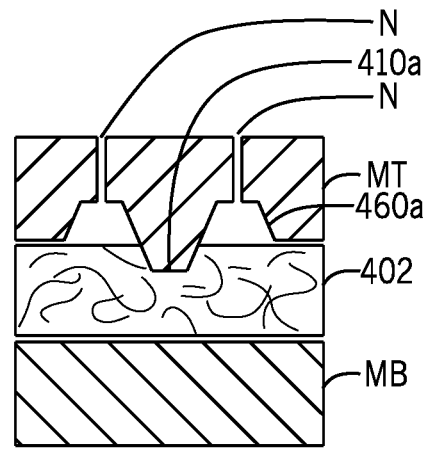
Figure 8C:
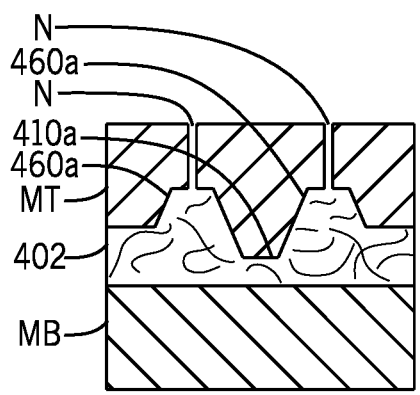
Figure 8D:
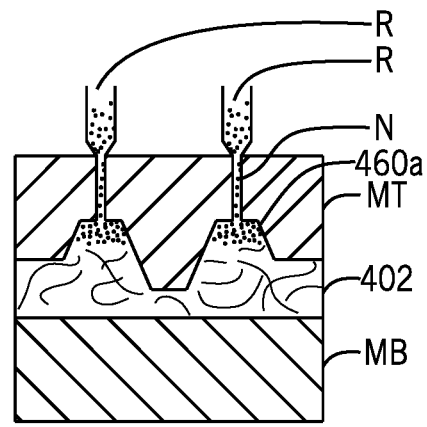
Figure 8E:
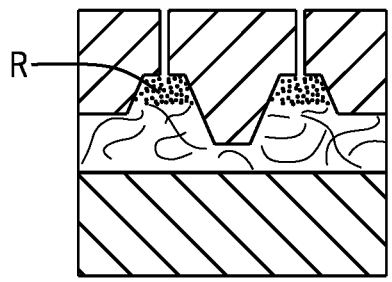
Figure 8F:
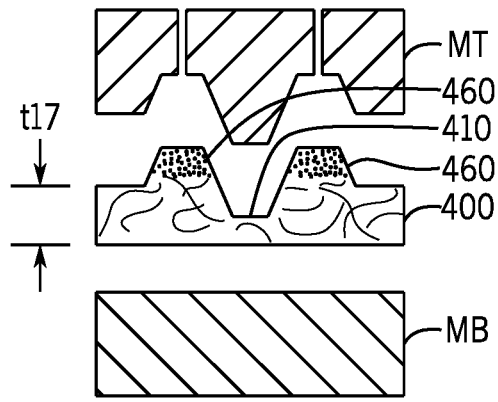

According to an exemplary embodiment as shown schematically in FIGS. 8A to 8C, the compressed fiber mat 402 may be placed between the mold top MT and the mold bottom MB; the mold top MT and the mold bottom MB may move between an open position and a closed position; the compressed fiber mat 402 may be further compressed between the mold top MT and the mold bottom MB. According to an exemplary embodiment, the compressed fiber mat 402 may be heated prior to compression and forming. According to an exemplary embodiment as shown schematically in FIGS. 8A to 8F, the mold top MT may include a protrusion feature 410a and two depression features 460a adjacent to the protrusion feature 410a. As the compressed fiber mat 402 is further compressed within the mold cavity, the protrusion feature 410a may push material on the compressed fiber mat 402 aside to form the depression 410 on the instrument panel 400. See also FIG. 8F. According to an exemplary embodiment as shown schematically in FIG. 8C, excess material around the depression 410 on the compressed fiber mat 402 may be pushed into the depression features 460a. According to an exemplary embodiment as shown schematically in FIG. 8D, resin R may be injected onto the backside of the compressed fiber mat 302 through the nozzles N. According to an exemplary embodiment, the resin R may push down the excess material formed in depression features 460a. According to an exemplary embodiment as shown schematically in FIG. 8E, the resin R may cure and harden. As shown schematically in FIG. 8F, the instrument panel 400 may be formed with the depression 410 and two ribs 460 adjacent to the depression 310. See also FIG. 5D. According to an exemplary embodiment as shown schematically in FIG. 8F, instrument panel 400 may have a substantially consistent density throughout the entire instrument panel 400. According to an exemplary embodiment, the smaller thickness at depression 410 may reduce the strength of the local area at the depression 410; the resin ribs 460 may increase the strength of the local area adjacent to the depression 410; the strength differential between the depression 310 and the adjacent ribs 460 may help directing the breakthrough energy of airbag towards depression 410 (i.e. the score line) during airbag deployment process. According to an exemplary embodiment as shown schematically in FIG. 8F, the instrument panel 400 may provide a smooth visible surface 400v; additional material may not be required to cover the visible surface 400v of the instrument panel 400. According to an exemplary embodiment, the instrument panel 400 may comprise a thickness t17 at positions other than other than at the depression 410 and the ribs 460; thickness t17 may be smaller than thickness t16.

Figure 9A:
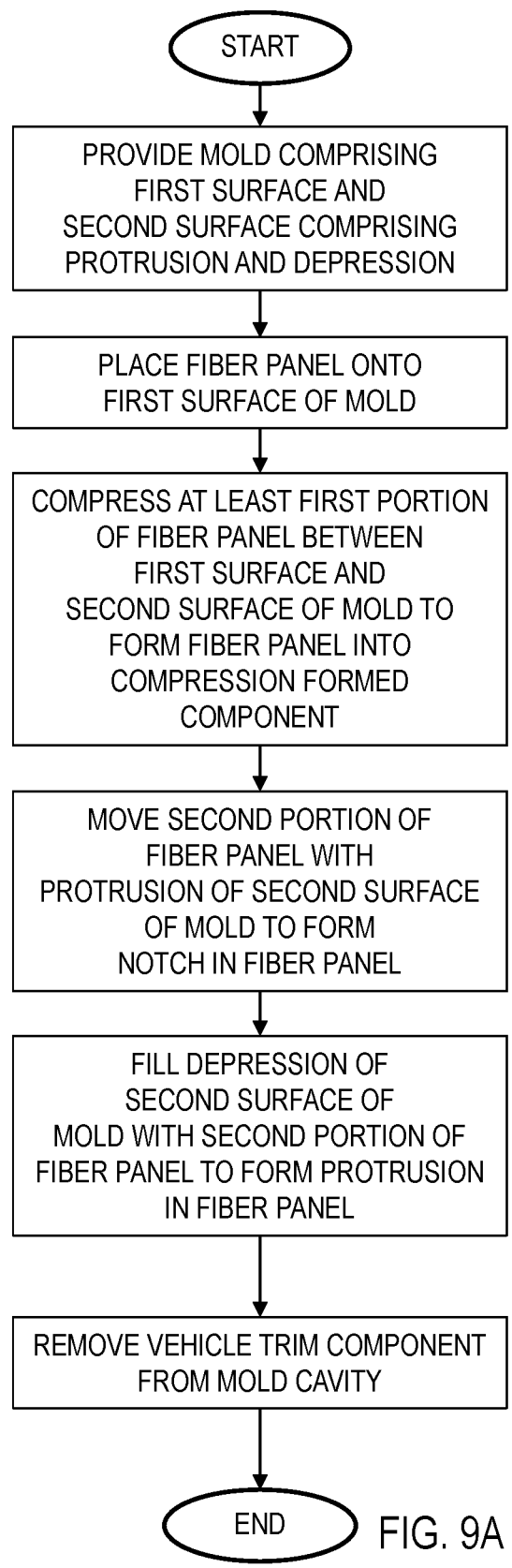
FIGS. 9A and 9B are schematic flow diagrams for forming a vehicle interior trim component according to an exemplary embodiment.
Figure 9B:
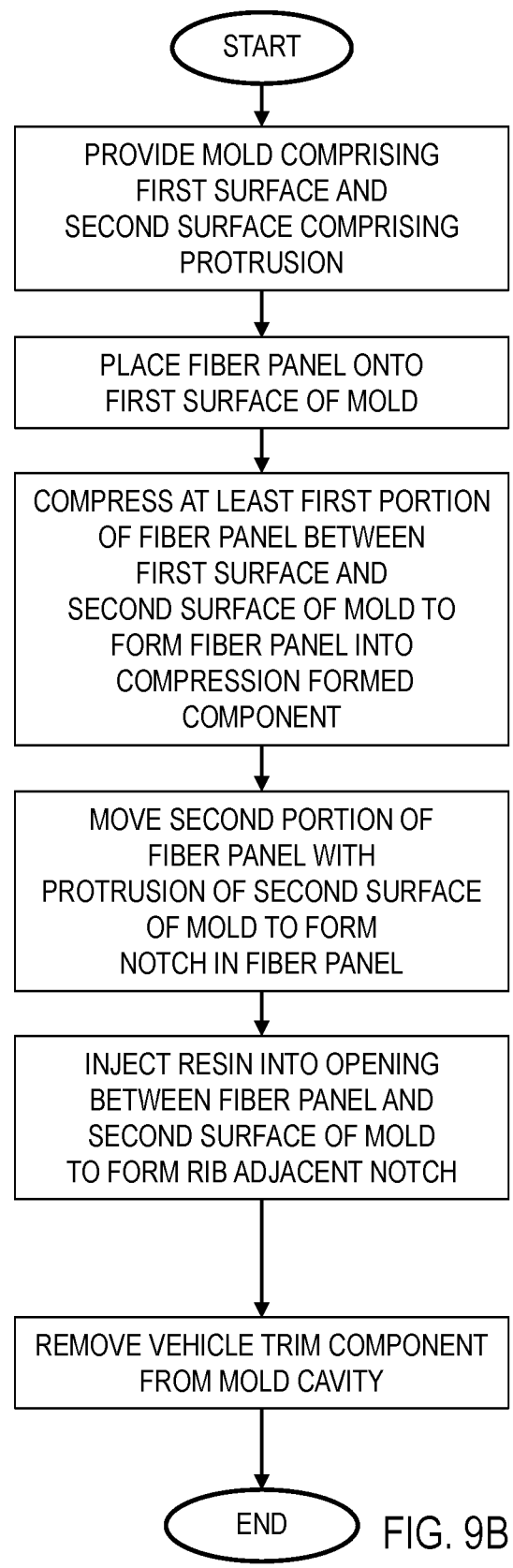

Referring to FIGS. 9A and 9B, a set of methods of forming a vehicle interior component (e.g. trim component) comprise a substrate/panel (e.g. mat, fiber panel, fiber mat, etc.) is shown schematically according to an exemplary embodiment. See also FIGS. 6A-6E, 7A-7F and 8A-8F.

According to an exemplary embodiment shown schematically in FIG. 9A, the method may comprise the steps of providing comprising a first surface and a second surface comprising a protrusion and a depression; placing a fiber panel onto the first surface of the mold and compressing at least a first portion of the fiber panel between the first surface and the second surface of the mold to form the fiber panel into a compression formed component; moving a second portion of the fiber panel with the protrusion of the second surface of the mold to form a notch in the fiber panel; filling the depression of the second surface of the mold with the second portion of the fiber panel to form a protrusion in the fiber panel. The vehicle trim component may then be removed from the mold cavity.

According to an exemplary embodiment shown schematically in FIG. 9B, the method may comprise the steps of providing comprising a first surface and a second surface comprising a protrusion; placing a fiber panel onto the first surface of the mold; compressing at least a first portion of the fiber panel between the first surface and the second surface of the mold to form the fiber panel into a compression formed component; moving a second portion of the fiber panel with the protrusion of the second surface of the mold to form a notch in the fiber panel; and injecting a resin may be injected into an opening between the fiber panel and the second surface of the mold to form a rib adjacent to the notch (e.g. the resin may at least partially fill at least one void between the second surface of the mold and an uncompressed portion of the fiber panel to form the rib coupled to the compression formed component and the resin may combine with the uncompressed portion of the fiber panel to form the rib. The vehicle interior/trim component may then be removed from the mold cavity.

Figure 10A:
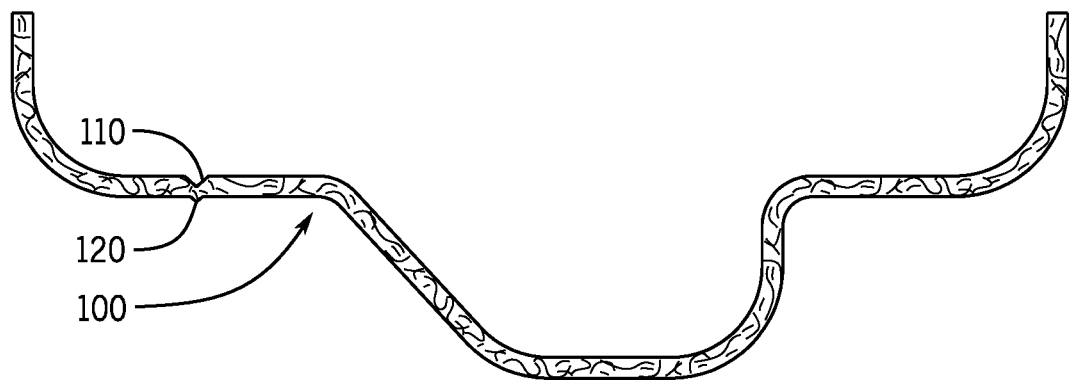
FIG. 10A is a schematic cross-section view of a conventional vehicle interior trim component according to an exemplary embodiment.
Figure 10B:
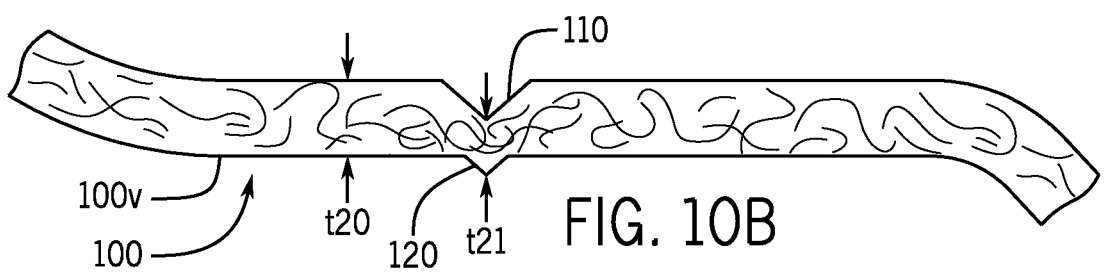
FIGS. 10B and 10C are schematic partial cross-section views of a conventional vehicle interior trim component according to an exemplary embodiment.

According to a conventional embodiment, a conventional trim panel is shown schematically as a conventional instrument panel 100 in FIG. 10A. According to the conventional embodiment as shown schematically in FIG. 10B, the conventional instrument panel 100 provides a conventional notch 110. As shown schematically in FIG. 10B, the conventional instrument panel 100 also provides a protrusion 120 on the visible surface 100v of the conventional instrument panel 100 opposite of the conventional notch 110. As shown schematically in FIG. 10B, the conventional instrument panel 100 has a smaller thickness t21 at the conventional notch 110 than thickness t20 at positions on the conventional instrument panel 100 other than the conventional notch 110. According to the conventional embodiment, the conventional instrument panel 100 also has a greater density at the conventional notch 110 due to the smaller thickness t21. According to the conventional embodiment, the greater density at the conventional notch 110 may increase the strength of the area around the conventional notch 110; a stronger notch 110 may require greater effort for an airbag to break through the conventional notch 110 during airbag deployment. According to the conventional embodiment, additional layers of material are required to cover and hide the protrusion 120 on the visible surface 100v of the conventional instrument panel 100 for aesthetic reasons (e.g. to provide a smooth visible surface in the vehicle interior).

Figure 10C:
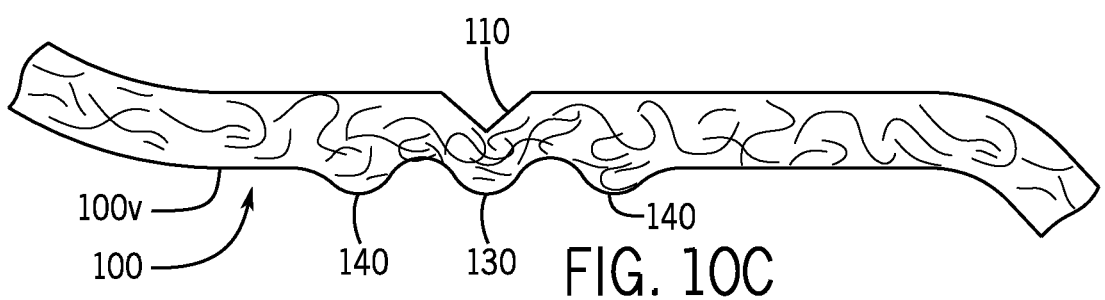

As shown schematically in FIG. 10C, the conventional instrument panel 100 provides the conventional notch 110. As shown schematically in FIG. 10C, the conventional instrument panel 100 also provides a protrusion 130 on the visible surface 100v of the conventional instrument panel 100 opposite of the conventional notch 110; the conventional instrument panel 100 also provides at least one protrusion 140 adjacent to protrusion 130 on the visible surface 100v of the conventional instrument panel 100. According to the conventional embodiment, the protrusions 130 and 140 are defects that occur after de-molding the instrument panel 100 due to not having a relief for the material of the notch 110 flow into during formation of the notch 110. According to the conventional embodiments, the protrusions 130, 140 may extend into one another. According to the conventional embodiment, additional material is required to cover and hide protrusion 130 and protrusions 140 on the visible surface 100v of the conventional instrument panel 100 (e.g. to provide a smooth visible surface in the vehicle interior).

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

What is claimed is:

1. A vehicle interior component formed in a mold and configured to facilitate deployment of an airbag from an airbag module comprising:
   a panel comprising fibers;
   wherein the panel comprises a rear side for the airbag module and a front side providing a surface;
   wherein the rear side of the panel is configured for contact from the airbag to establish an opening for deployment of the airbag;

wherein the panel comprises a notch formed as a depression in the rear side of the panel to establish the opening for deployment of the airbag;
wherein the rear side of the panel is configured to support the airbag module;
wherein the panel comprises at least one feature at the rear side of the panel adjacent the notch;
wherein the front side of the panel comprises a substantially planar surface opposite the notch;
wherein the panel comprising fibers comprises a fiber panel;
wherein the notch is formed by:
(a) compressing at least a first portion of the fiber panel between a first surface and a second surface of the mold;
(b) penetrating material of the fiber panel at the rear side with a protrusion of the mold to push material of the fiber panel aside to form the notch in the rear side and maintain a continuous surface at the front side; and
(c) filling a depression of the mold with material of the fiber panel to form a protrusion at the rear side.

2. The vehicle interior component of claim 1 wherein the panel further comprises at least one of (a) a resin; (b) a thermoplastic resin; (c) polypropylene; (d) acrylonitrile butadiene styrene; (e) polycarbonate.

3. The vehicle interior component of claim 1 wherein the notch is configured to direct deployment of the airbag through the panel.

4. The vehicle interior component of claim 1 wherein the feature comprises a protrusion configured to provide a relief for the notch.

5. The vehicle interior component of claim 4 further comprising a rib adjacent the notch.

6. The vehicle interior component of claim 5 wherein the rib is configured to direct deployment of the airbag through the panel.

7. The vehicle interior component of claim 1 wherein the front side of the panel further comprises a substantially non-planar surface.

8. The vehicle interior component of claim 1 wherein the feature comprises a rib configured to direct deployment of the airbag through the panel.

9. The vehicle interior component of claim 8 wherein the rib is formed on the panel.

10. The vehicle interior component of claim 8 wherein the rib comprises a resin portion comprising resin and a fiber portion comprising fibers of the panel.

11. A vehicle interior component formed in a mold and configured to facilitate deployment of an airbag from an airbag module comprising;
a panel comprising fibers;
wherein the panel comprises a front side and a rear side;
wherein the panel comprises a first portion comprising a first thickness, a second portion comprising a second thickness less than the first thickness and a third portion comprising a third thickness greater than the first thickness;
wherein the rear side of the panel is configured to support the airbag module;
wherein the front side of the panel is configured to provide a surface;
wherein the first portion of the panel is separated from the second portion of the panel by the third portion of the panel;
wherein the second portion of the panel comprises a notch formed as a depression in the rear side of the panel and configured to direct deployment of the airbag through the panel;
wherein the third portion of the panel comprises at least one feature at the rear side of the panel adjacent the notch:
wherein the panel comprising fibers comprises a fiber panel;
wherein the notch is formed by:
(a) compressing the fiber panel in the mold;
(b) penetrating material of the fiber panel at the rear side with a protrusion of the mold to push material of the fiber panel aside to form the notch in the rear side and maintain a continuous surface at the front side; and
(c) filling a depression of the mold with material of the fiber panel to form a protrusion at the rear side.

12. The vehicle interior component of claim 11 wherein the first portion, the second portion and the third portion comprise a substantially constant density.

13. The vehicle interior component of claim 11 wherein the first portion, the second portion and the third portion comprise a substantially continuous surface at the front side of the panel.

14. The vehicle interior component of claim 11 wherein the third portion at least one of (a) extends from the second portion; (b) is adjacent the second portion.

15. The vehicle interior component of claim 11 wherein at least one of (a) the second portion and the third portion are formed concurrently; (b) the third portion is formed in response to formation of the second portion.

16. The vehicle interior component of claim 11 further comprising a rib formed on the panel adjacent the notch.

17. A method of manufacturing a vehicle interior component comprising:
(a) providing a mold comprising a first surface and a second surface comprising a protrusion and a depression;
(b) disposing a fiber panel comprising a first side and a second side onto the first surface of a mold;
(c) compressing at least a first portion of the fiber panel between the first surface and the second surface of the mold;
(d) penetrating material of the fiber panel at the first side of the panel with the protrusion of the second surface of the mold to push material of the fiber panel aside to form a notch in the first side of the fiber panel and maintain a continuous surface at the second side of the fiber panel; and
(e) filling the depression of the second surface of the mold with material of the fiber panel to form a protrusion at the first side of the fiber panel.

18. The method of claim 17 further comprising a step of injecting resin into the mold at the depression of the second surface of the mold to form a rib.

19. The method of claim 18 wherein the step of injecting resin into the mold comprises moving material of the fiber panel toward the second surface of the fiber panel.

20. The method of claim 17 wherein the notch is configured to establish an opening in the vehicle interior component for deployment of an airbag through the vehicle interior component.

* * * * *